Patented Sept. 12, 1933

1,926,855

UNITED STATES PATENT OFFICE 1,926,855

SOLDER

Edward J. Kratz, Springdale, and Conral C. Callis, Oakmont, Pa., assignors to Aluminum Company of America, Pittsburgh, Pa., a corporation of Pennsylvania No Drawing. Application July 30, 1932
Serial No. 627,146

4 Claims. (Cl. 75—1)

This invention relates to a composition of matter for soldering aluminum and aluminum base alloys, the primary object of this invention being the provision of a solder which can be applied at a relatively low temperature, which is both strong and ductile, and which also has the property of high resistance to corrosion.

We have found that previous compositions in use for this same purpose generally had one or two favorable characteristics accompanied by certain unfavorable characteristics. Thus, many composition having a low freezing point are quite susceptible to corrosion by moist air, salt water, etc. Also, some compositions having a high freezing point are more resistant to corrosion and may have a fairly high strength. However, the high freezing point solders are difficult to apply because of the high temperature required and frequently are lacking in ductility and are susceptible to cracking. This last unfavorable characteristic is particularly noticeable in the forming of long soldered joints, such as are encountered in the installation of sheet metal roofing.

The soldering composition which we have found to give the best results from the standpoint of corrosion-resistance, strength, ductility and ease of application, together with a low freezing point, is a mixture of tin, lead, zinc and aluminum combined in proportions of 37 to 45 per cent by weight of tin, 37 to 45 per cent by weight of lead, 9 to 21 per cent by weight of zinc, and 1 to 5 per cent by weight of aluminum. While these constituents may be varied within the limits given without losing the advantages of this invention, we prefer mixtures having the following proportions:

Percentage by weight

| Composition | Tin | Lead | Zinc | Aluminum | Freezing point °F |
|---|---|---|---|---|---|
| I | 45.0 | 45.0 | 9 | 1 | 388 |
| II | 44.0 | 44.0 | 10 | 2 | 410 |
| III | 37.0 | 37.0 | 21 | 5 | 500 |

It can be seen that with an increase in both the zinc and the aluminum content the freezing point is raised, and it has been found that these higher freezing point solders are stronger, though somewhat less ductile, than the compositions having less of these two constituents, although, as stated before, there is little difference in the quality of the solder within the limits given. The selection of the proper composition is indicated by the work contemplated; for example, on long joints where maximum ductility is desired, Composition I might be preferably, or, in another case where maximum hardness is desired, Composition III would be chosen.

The various mixtures given above are prepared by melting the constituents together in any well known manner and may be used in the molten state, or may be prepared by casting or otherwise forming the resulting solder into various shapes, such as strips, ribbon, wire, etc., for convenience in the application of the solder. For the purpose of making these compositions we prefer to use commercially pure metal, as we have found that impurities may result in drossing, which makes the solder difficult to apply, and may produce a non-uniform joint. Further, it has been found that soldered joints made of solder compounded of less pure metals have somewhat inferior corrosion-resistance.

The solder hereinabove shown may be applied by any of the well known soldering processes, such as by pouring, dipping, or by the use of an iron. The solder can be applied either with or without the use of a flux. However, for the best results we prefer to use a flux such as is shown in copending applications, Serial No. 639,841 and Serial No. 639,842, filed October 27, 1932 and Serial No. 649,325, filed December 29, 1932, consisting, for example, of about 5 per cent stannous bromide, 40 per cent cadmium chloride, 20 per cent cadmium iodide, 25 per cent ammonium chloride, 2 per cent ammonium fluoride, and 8 per cent zinc chloride, by weight, to which is added a vehicle. This vehicle consists of a mixture of chlorinated diphenyl and chlorinated naphthalene melted together and to which is added up to about 15 per cent by weight of para-dichlorbenzene or cyclo-hexanol to secure any desired degree of fluidity. The salt flux and the vehicle are finally mixed together in the approximate proportions of about 4 parts of the salts to 6 parts of the vehicle.

We claim:

1. A composition of matter for soldering aluminum and its alloys consisting of about 37 to 45 per cent by weight of tin, about 37 to 45 per cent by weight of lead, about 9 to 21 per cent by weight of zinc, and about 1 to 5 per cent by weight of aluminum.

2. A composition of matter for soldering aluminum and its alloys consisting of about 45 per cent by weight of tin, about 45 per cent by weight of lead, about 9 per cent by weight of zinc, and about 1 per cent by weight of aluminum.

3. A composition of matter for soldering aluminum and its alloys consisting of about 44 per cent by weight of tin, about 44 per cent by weight of lead, about 10 per cent by weight of zinc, and about 2 per cent by weight of aluminum.

4. A composition of matter for soldering aluminum and its alloys consisting of about 37 per cent by weight of tin, about 37 per cent by weight of lead, about 21 per cent by weight of zinc, and about 5 per cent by weight of aluminum.

EDWARD J. KRATZ.
CONRAL C. CALLIS.